May 18, 1926.
C. J. BOHMBACH
SHADE ATTACHMENT FOR AUTOMOBILES
Filed August 29, 1925
1,584,722
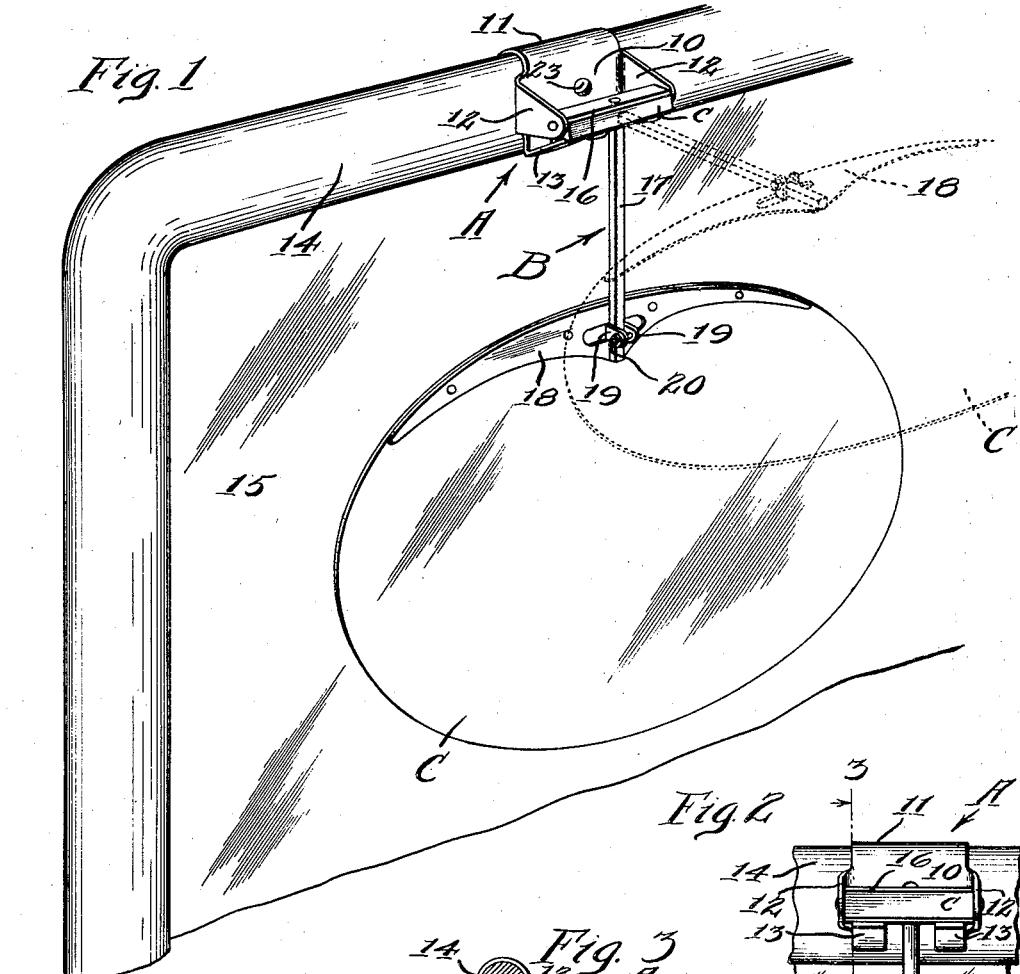
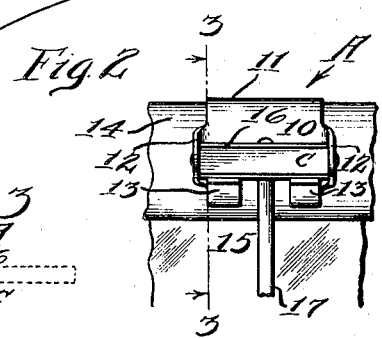
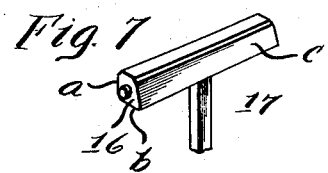
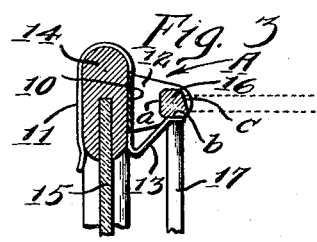
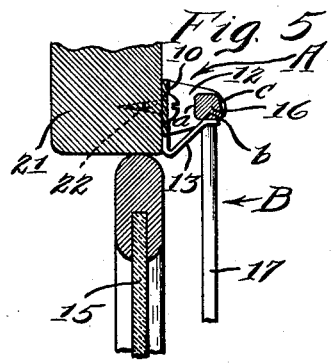
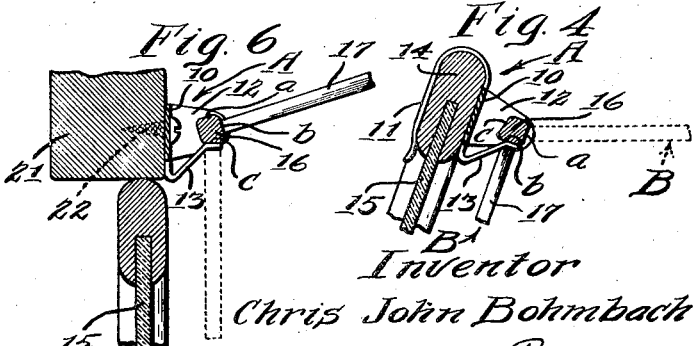
Inventor
Chris John Bohmbach
By Bradbury & Caswell
Attorneys Patented May 18, 1926.

1,584,722

UNITED STATES PATENT OFFICE.

CHRIS JOHN BOHMBACH, OF RED WING, MINNESOTA.

SHADE ATTACHMENT FOR AUTOMOBILES.

Application filed August 29, 1925. Serial No. 53,260.

My invention relates to improvements in automobile shade attachments for protecting a driver's eyes against the glare of blinding light.

An object of the invention is to provide an improved automobile shade attachment for eliminating glare from lights at night and sun by day, the same being simple, durable and inexpensive in construction and readily applicable to the different styles of automobiles.

More specifically it is my object to provide a shade attachment including a hingedly supported screen adapted to be swung downward into position in front of a driver and upward into position against the top of an automobile and, further, to provide means for yieldingly holding said screen in each of said positions.

Another object is to supply an article of the character above noted, wherein a simple reversal of parts provides for the holding of the hingedly supported screen in different elevated positions.

With the foregoing and other objects in view, which will appear in the following description, the invention resides in the novel combination and arrangement of parts and in the details of construction hereinafter described and claimed.

In the drawings, Fig. 1 is a perspective view illustrating an embodiment of my invention as applied to an automobile windshield; Fig. 2 is an elevational view in detail, the same showing a portion of the screen supporting frame and the hanger for said frame; Fig. 3 is a sectional view taken on the line 3—3 of Fig. 2; Fig. 4 is a view similar to Fig. 3, the windshield being shown as sloping and the cross-head of the frame reversed in the hanger to provide for ample elevation of said frame in its position of disuse; Figs. 5 and 6 are also sectional views, said views showing an alternate form of hanger designed for application to the framework of an automobile top and Fig. 7 is a perspective view illustrating, in detail, the reversible cross-head and a portion of the frame stem joined to said cross-head.

Referring to the drawing, it will be seen that my improved device comprises a hanger A, a frame B supported by said hanger and a dimmer screen C carried by the frame.

The hanger A, stamped from resilient sheet material, includes a body 10, clip 11, ears 12 and fingers 13. The clip 11 is turned back from the upper edge of the body, the ears 12 being turned forward from the ends thereof and the fingers 13 turned upwardly and forwardly from the lower edge of said body. Said clip 11 is designed to close over the upper frame bar 14 of a windshield 15 and anchor the body 10 thereto, as shown in Figs. 1–4 of the drawing.

The frame B comprises a cross-head 16, a stem 17 secured thereto medially thereof and a frame-plate 18. The cross-head 16, reversibly trunnioned at the ends thereof in the ears 12, provides a hinged connection between the frame B and hanger A. The frame-plate 18 constitutes a fastening member to which the dimmer screen C is marginally secured. This frame-plate, preferably made of sheet metal, has a pair of ears 19 struck therefrom. The stem 17 of the frame B passes between and is gripped by the ears 19 upon the tightening of a clamping bolt 20 reaching through said ears. The cross-head 16, which is angular in cross-section, has three faces $a$, $b$, and $c$ adapted severally to be engaged by the fingers 13. The face $a$ is disposed in a plane parallel with the axis of the stem 17. The face $c$, opposing said face $a$, is disposed in a plane intersecting the axis of said stem and the face $b$ is at right angles to said axis. In that end-for-end position of the cross-head 16 in the hanger A, as shown in Figs. 1–2, the faces $a$, $b$ of the cross-head 16 are severally engaged by the fingers 13, while in the reversed position of said cross-head 16 (Fig. 4), the faces $b$, $c$ thereof are severally engaged by said fingers 13.

In the depending position of the frame B (solid lines, Figs. 1 and 3), wherein the screen C is disposed for use, the fingers 13 engage the surface $b$ of the cross-head 16 and yieldingly hold said frame against swinging movement. In the elevated relation of said frame B (dotted lines, Figs. 1 and 3) wherein the screen C is located in position of disuse, the fingers 13 engage the surface $a$ of the cross-head 16 and yieldingly hold said frame elevated. Upon reversing the cross-head 16, end-for-end, in the ears 12, the fingers 13 engage the surface $c$ of said cross-head in the elevated position of the frame B (Figs. 4 and 6). When my device is applied to an automobile body having a relatively low ceiling and an upright windshield, the cross-head 16 is trunnioned in the ears 12 in that end-for-end relation shown in Figs. 1 and 3. When the automobile body has enough head-room to permit of the swinging of the frame B into position of disuse above the horizontal, the cross-head 16 is reversed (Fig. 6) so that said frame and the screen C thereon will be held well out of the way of the driver's head. Such reversed relation of cross-head 16 finds advantage when the device is to be applied to a sloping windshield, as at 15, Fig. 4. The position of disuse of the frame B in an installation of this character is about on the horizontal as opposed to a position relatively depressed and which would be occupied by said frame B and screen C, were the cross-head 16 to be in the first described end-for-end relation with respect to the hanger A.

In an alternate form of bracket A (Figs. 5 and 6), the clip is omitted. This form of bracket is adapted for application to the bow 21 of an automobile body above the windshield, a screw 22 being passed through an aperture 23 in the body 10 of the hanger A and threaded into said bow.

The ears 12 of the hanger A are easily sprung to permit of the reversal of the cross-head 16 end-for-end therein and the bolt 20 (Fig. 1) is readily manipulated to secure the desired adjustment of the screen C longitudinally of the stem 17.

Changes in the specific form of my invention, as herein disclosed, may be made within the scope of what is claimed without departing from the spirit of my invention.

Having described my invention, what I claim as new and desire to protect by Letters Patent is:

1. In a device of the class described, a hanger comprising a body, a clip for anchoring said body in place on a support, a pair of ears and a pair of yielding fingers, said clip, ears and fingers being integral with and turned upon said body, a frame including a cross-head reversibly trunnioned at its ends in said ears, a stem fixed at one end to said cross-head, and a frame-plate mounted on the free end of said stem for sliding adjustment longitudinally thereof, a dimmer screen secured to said frame-plate, said cross-head being angular in cross section and having three faces for co-operation severally with said fingers, two of said faces being relatively opposed, one in a plane parallel with the axis of said stem and the other in a plane intersecting said axis, the third face being disposed in a plane at right angles to the stem, one of the opposed faces being adapted to co-operate with said fingers in one end-for-end position of the cross-head in said ears, the other of said opposed faces being adapted for co-operation with said fingers in a reversed end-for-end position of said cross-head and the third face being adapted for co-operation with said fingers in both end-for-end positions of the cross-head.

2. In a device of the class described, a hanger for application to a support, a hinged frame including a cross-head reversibly trunnioned at its ends in said hanger, a dimmer shield mounted on the free end of said frame, said cross-head being formed with angularly related faces, a yielding, frame holding finger on the hanger for co-operation severally with certain of the faces in each end-for-end position of the cross-head in the hanger, said faces being relatively disposed to provide for the holding of the frame in different angular relations with respect to the hanger upon reversal of said cross-head in said hanger.

3. In a device of the class described, a hanger for application to a support, a frame including a head formed with angularly related faces, said head being reversibly hinged on said hanger, a dimmer shield mounted on the free end of said frame, a yielding member for co-operation severally with certain of said faces in each of the respective positions of said head in said hanger, said faces being relatively disposed to provide for the holding of the frame in different angular relation with respect to the hanger upon reversal of said head in said hanger.

4. In a device of the class described, a hanger formed of resilient sheet material comprising a body portion, a clip issuing forwardly from the upper part of said body portion adapted to embrace the frame bar of a windshield to hold said hanger supported thereon, a pair of spaced ears bent back from the ends of said body portion, a pair of spaced fingers bent back from the lower edge of the body portion, a cross-head pivoted between said ears, a stem secured at one end thereof to said cross head between said fingers, a dimmer screen attached to the free end of said stem, said cross-head being engaged at either side of said stem with said fingers and formed for co-operation therewith to hold the stem and screen thereon in various angular positions with respect to the hanger.

In testimony whereof, I have signed my name to this specification.

CHRIS JOHN BOHMBACH.